O. E. GROSHELL.
AUXILIARY INDICATING DEVICE FOR CASH REGISTERS.
APPLICATION FILED MAY 1, 1916.
1,217,753.
Patented Feb. 27, 1917.
8 SHEETS—SHEET 1.
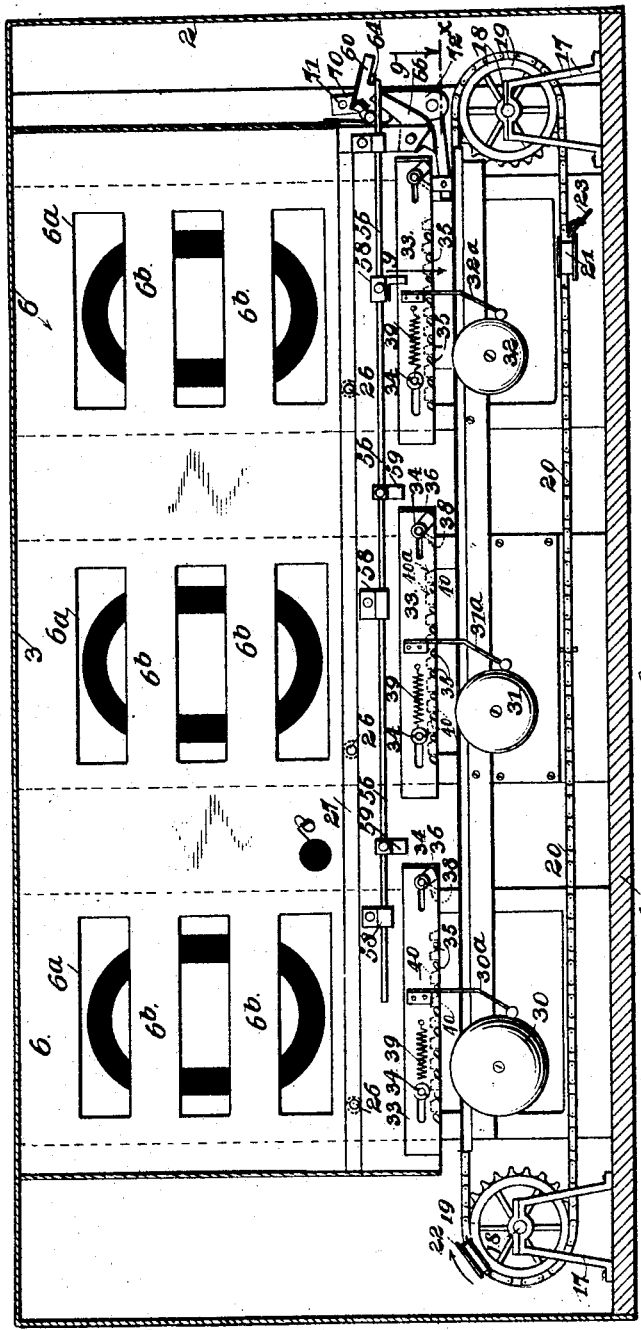
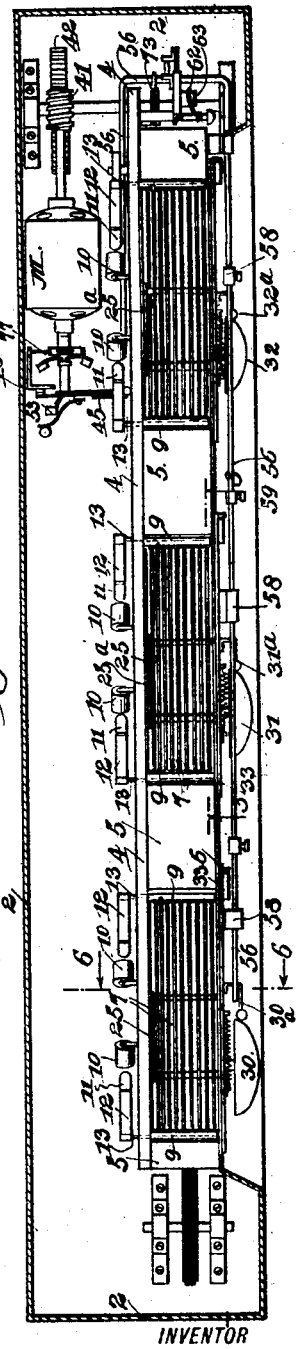
WITNESSES
INVENTOR
Oscar E. Groshell
BY
ATTORNEYS O. E. GROSHELL.
AUXILIARY INDICATING DEVICE FOR CASH REGISTERS.
APPLICATION FILED MAY 1, 1916.
1,217,753.
Patented Feb. 27, 1917.
8 SHEETS—SHEET 2.
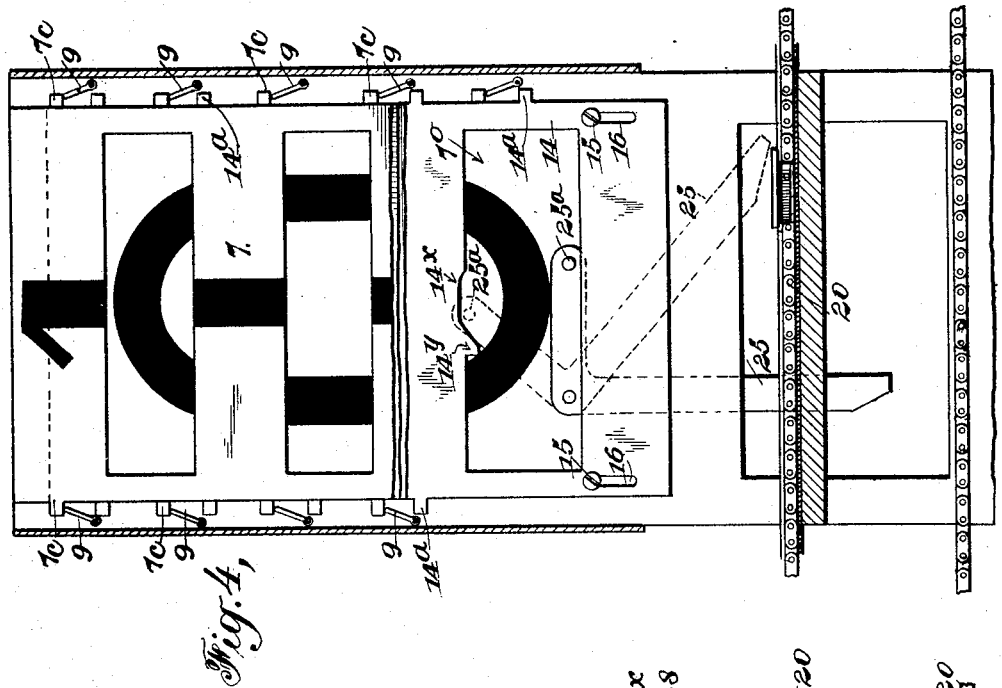
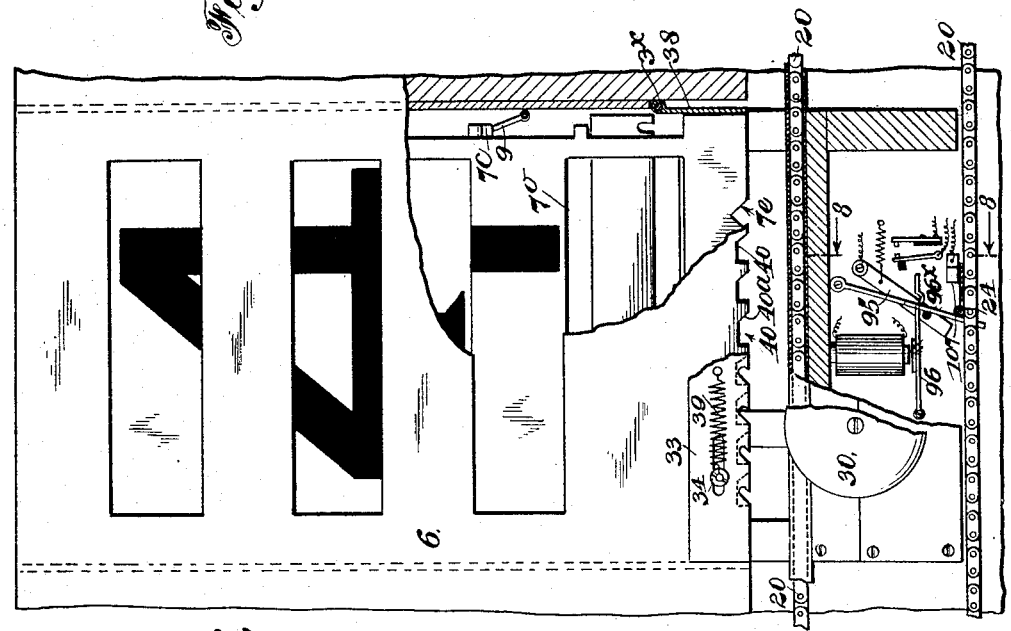
WITNESSES
INVENTOR
Oscar E. Groshell
BY
ATTORNEYS O. E. GROSHELL.
AUXILIARY INDICATING DEVICE FOR CASH REGISTERS.
APPLICATION FILED MAY 1, 1916.
1,217,753.
Patented Feb. 27, 1917.
8 SHEETS—SHEET 3.
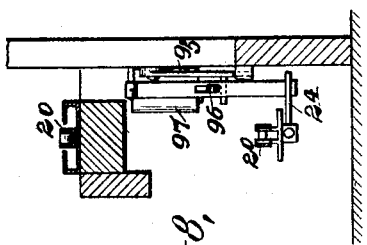
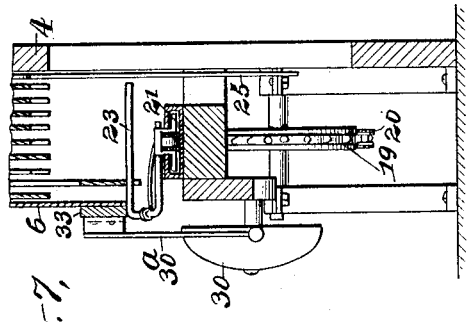
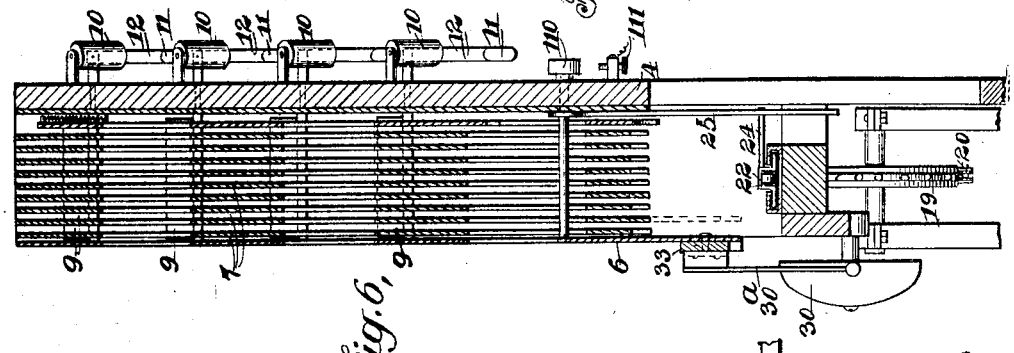
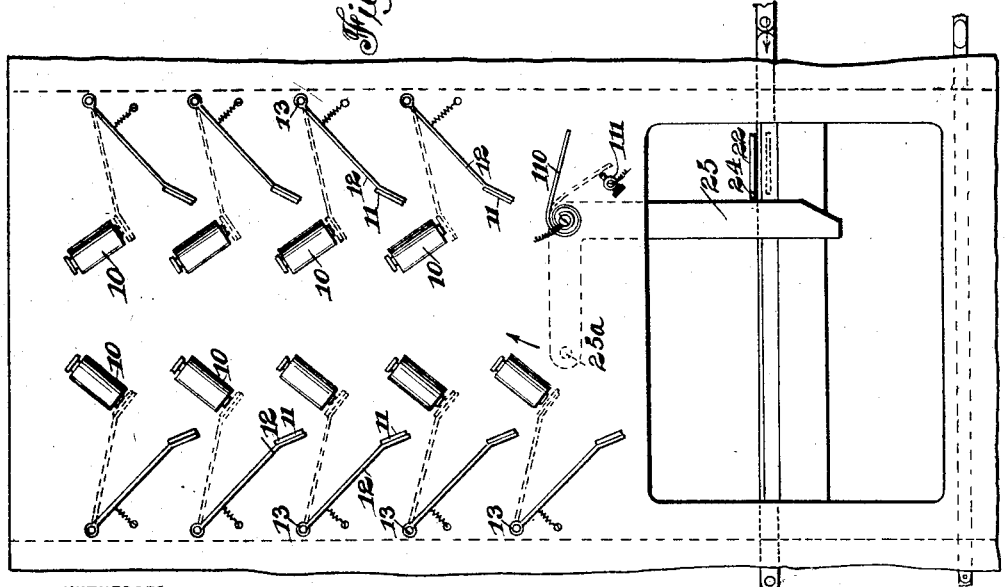
WITNESSES
L. Hauerstein
L. A. Stanley
INVENTOR
Oscar E. Groshell
BY Munn & Co.
ATTORNEYS

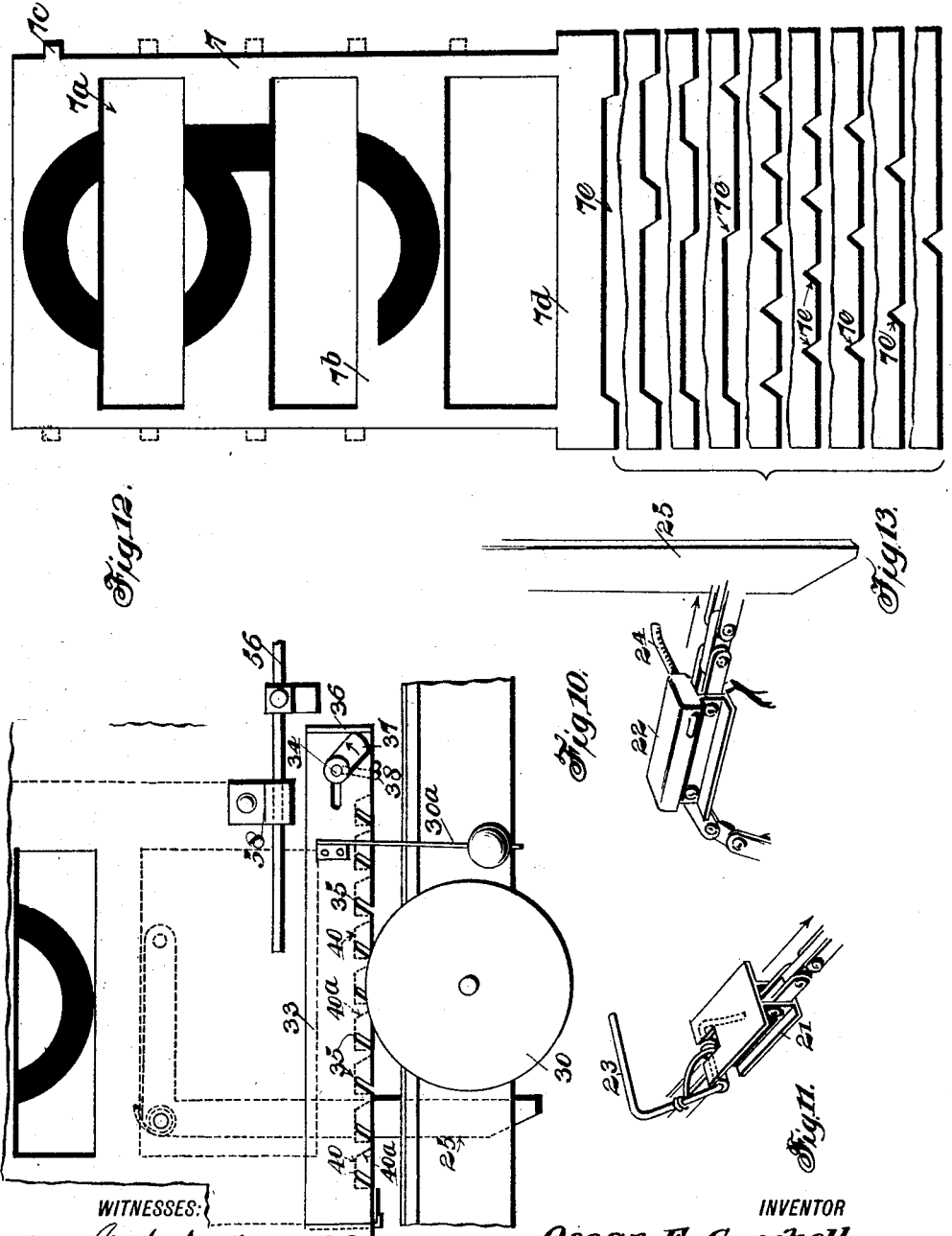

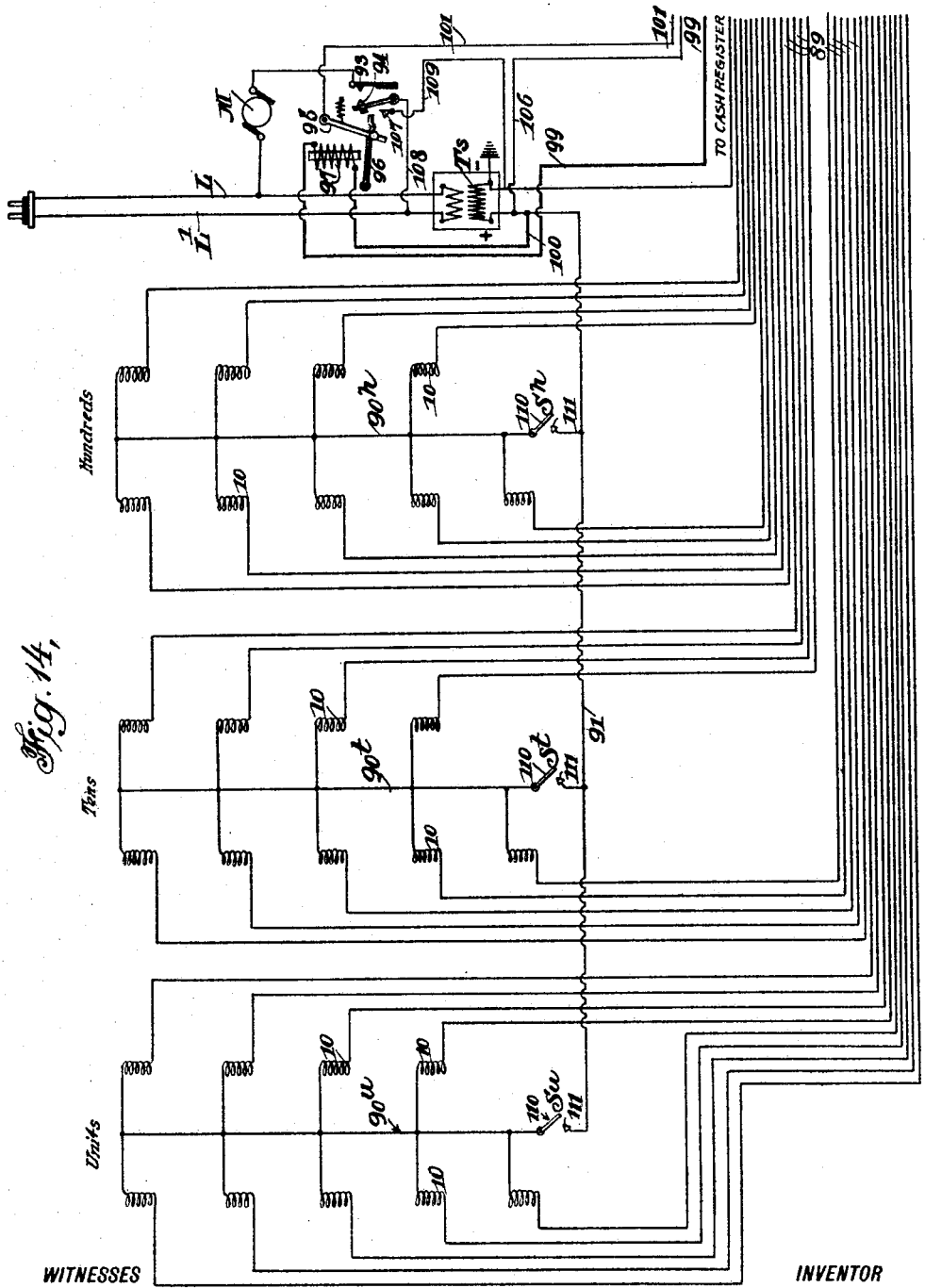

O. E. GROSHELL.
AUXILIARY INDICATING DEVICE FOR CASH REGISTERS.
APPLICATION FILED MAY 1, 1916.
1,217,753.
Patented Feb. 27, 1917.
8 SHEETS—SHEET 6.
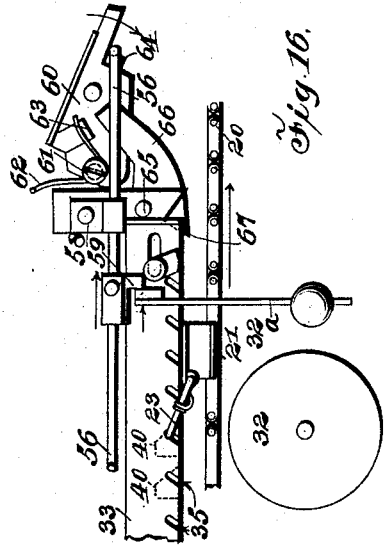
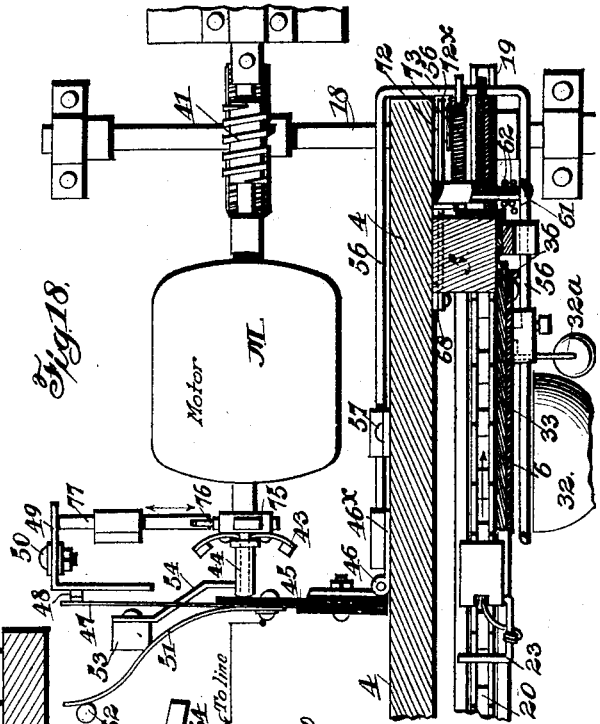
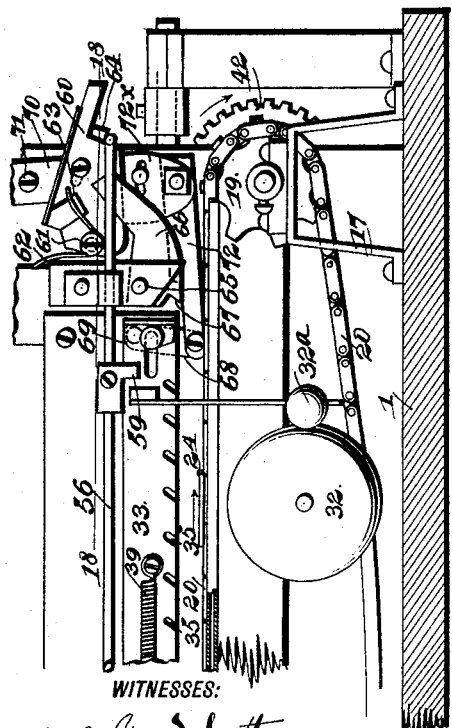
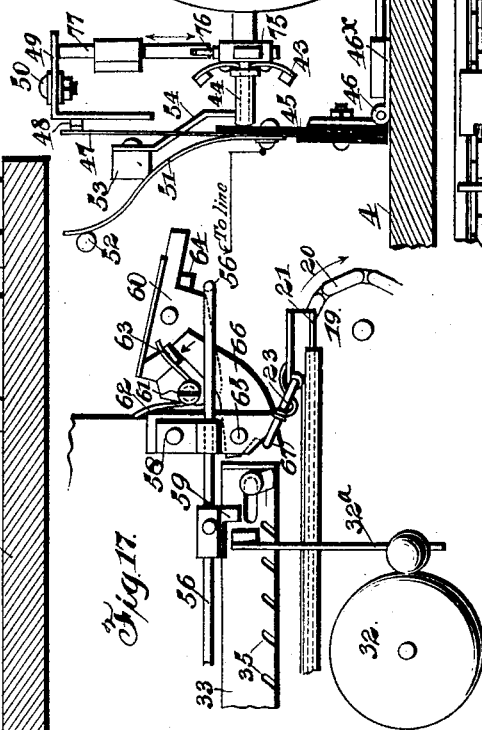
WITNESSES:
John D. Schrott
L. A. Stanley
INVENTOR
Oscar E. Groshell
BY
Munn & Co.
ATTORNEYS

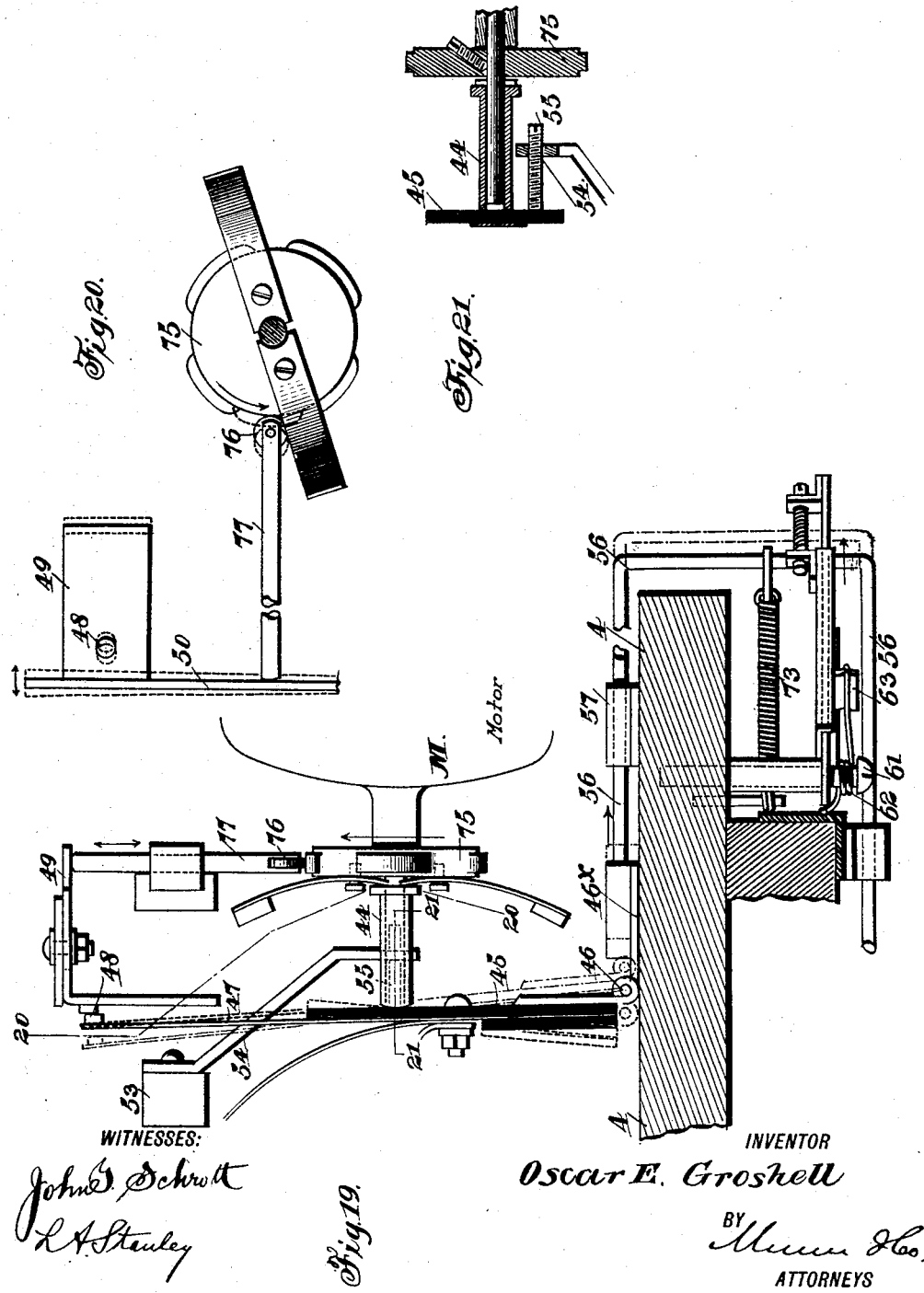

O. E. GROSHELL.
AUXILIARY INDICATING DEVICE FOR CASH REGISTERS.
APPLICATION FILED MAY 1, 1916.
1,217,753.
Patented Feb. 27, 1917.
8 SHEETS—SHEET 8.
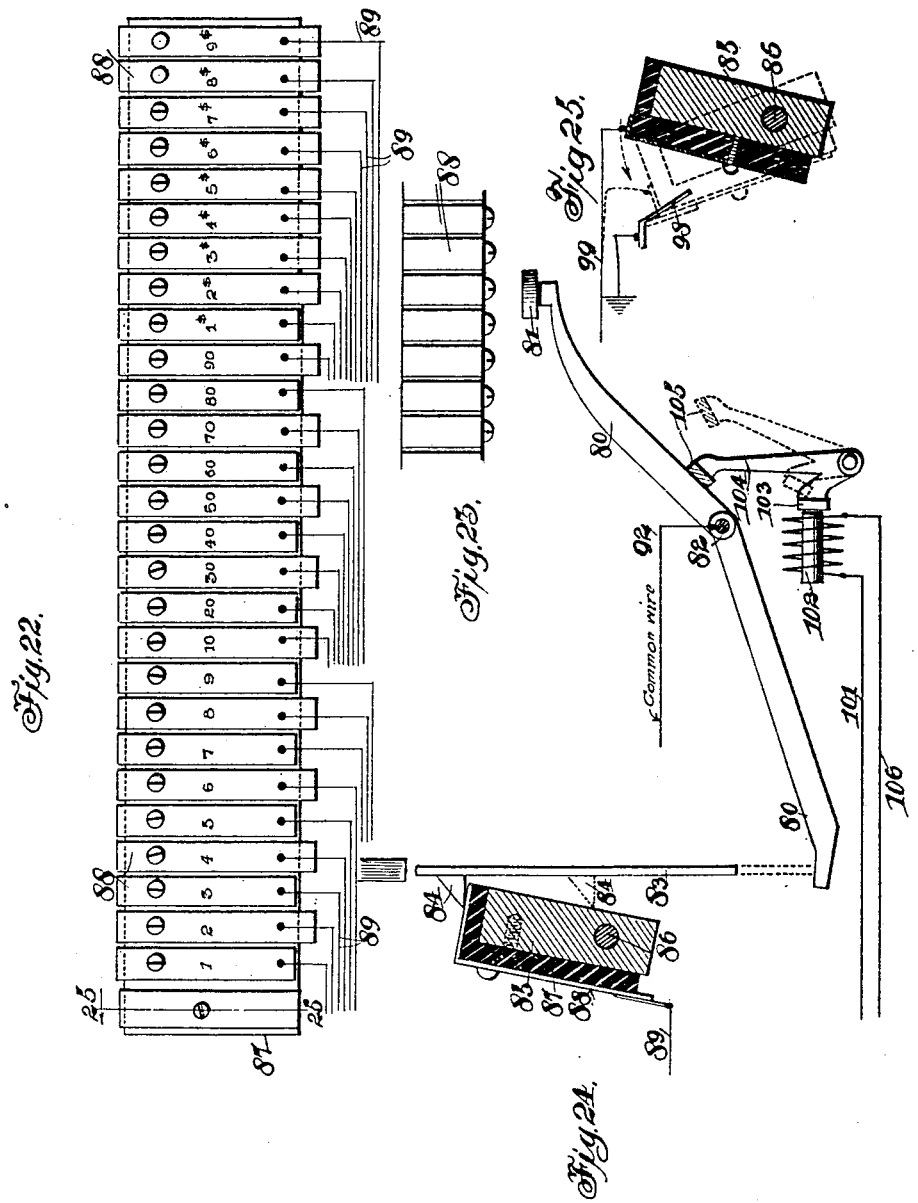
WITNESSES:
John D. Schrott
L. A. Stanley
INVENTOR
Oscar E. Groshell
BY
ATTORNEYS

UNITED STATES PATENT OFFICE.

OSCAR E. GROSHELL, OF SALT LAKE CITY, UTAH.

AUXILIARY INDICATING DEVICE FOR CASH-REGISTERS.

1,217,753.  Specification of Letters Patent.  Patented Feb. 27, 1917.

Application filed May 1, 1916. Serial No. 94,612.

*To all whom it may concern:*

Be it known that I, OSCAR E. GROSHELL, a citizen of the United States, and a resident of Salt Lake City, in the county of Salt Lake and State of Utah, have made certain new and useful Improvements in Auxiliary Indicating Devices for Cash-Registers, of which the following is a specification.

My invention relates to improvements in auxiliary indicating devices for cash registers, and it consists in the combinations, constructions, and arrangements herein described and claimed.

An object of my invention is to provide an indicating device having large numerals, which may be located in a position in which the numerals may be easily seen by the proprietor or manager of the establishment in which the cash register is being used, and which will display numerals which are duplicates of those brought into view by the operation of the cash register itself.

A further object of my invention is to provide a device of the type described in which an audible indication of the amount of a sale which the salesman registers on the cash register, this audible indication being given in suitable means such as bells or other similar sounding device.

A further object of my invention is to provide an auxiliary indicating device in which numerals from zero to nine (9) inclusive, are displayed through a single series of openings, the cards or plates bearing the numerals being arranged in position one immediately behind the other.

A further object of my invention is to provide an electric operating device for the auxiliary indicator, which is connected with the cash register, and which accurately causes the duplication of the indicating numerals which are brought into view by the cash register.

A further object of my invention is to provide an electrical operating means for the auxiliary indicating device, including a motor and an endless chain operated by the motor, with means for slowing up the action of the motor automatically when the bells are being sounded.

A further object of my invention is to provide a movable contact which does away with the necessity of using platinum contacts, while at the same time providing means for effecting a good electrical connection at all times.

Further objects and advantages will appear in the following specification, and the novel features of the invention will be particularly pointed out in the appended claims.

My invention is illustrated in the accompanying drawing forming part of this application in which:

Figure 1 is a front elevation, the casing being shown in section.

Fig. 2 is a top plan view of the casing being shown in section.

Fig. 3 is a front elevation of one of the indicator units, certain parts being shown in section for the sake of clearness.

Fig. 4 is a section through one of the units showing a portion of the rear plate and its operative relation with certain parts of the electrical operating system.

Fig. 5 is a rear elevation of one of the indicator units.

Fig. 6 is a section along the line 6—6 of Fig. 2.

Fig. 7 is a fragmentary sectional view of the bottom portion of the device.

Fig. 8 is a section on the line 8—8 of Fig. 3.

Fig. 9 is a front view of a portion of one of the units showing the bell sounding apparatus.

Fig. 10 is a detailed perspective view of a portion of the plate operating means.

Fig. 11 is a detailed perspective view of the bell sounding means.

Fig. 12 is a face view of one of the indicator plates.

Fig. 13 shows the bottoms of the remaining plates and the recesses therein.

Fig. 14 is a diagrammatic view of the electrical circuits.

Fig. 15 is a detailed side view of the speed control mechanism showing the latter in its normal position.

Fig. 16 is a detailed view showing the bell actuating mechanism in operation, and the speed control mechanism in second position.

Fig. 17 is a view somewhat similar to Fig. 16, but showing the bell ringing arm in position for releasing a pawl.

Fig. 18 is a section on the line 18—18 of Fig. 15.

Fig. 19 is a view somewhat similar to Fig. 18 showing different positions of a contact in the motor circuit.

Fig. 20 is a section along the line 20—20 of Fig. 19.

Fig. 21 is a section on the line 21—21 of Fig. 19.

Fig. 22 is a side elevation of a contact bearing bar carried by the cash register for completing the electrical circuits through the auxiliary indicating devices.

Fig. 23 is a detailed plan view of a portion of the mechanism shown in Fig. 22.

Fig. 24 is a sectional view through the contact bearing bar showing its relation with a key lever of the cash register.

Fig. 25 is a section on line 25—25 of Fig. 22.

In carrying out my invention I provide a casing consisting of a base 1, sides and ends 2, and a top 3. Extending longitudinally with respect to the casing is a wall 4 having forwardly extending posts 5 secured thereto, there being four of these posts and spaced between adjacent posts, and a front plate 6 constituting compartments for numeral bearing plates 7.

As will be seen from the drawing, there are three of these compartments, one for each unit. It will be understood that the term "unit" as used here does not refer to the numerals, but to the fact that there are three sets of plates bearing numerals, each of these sets being regarded as a "unit". I may state at this point that while three (3) sets are shown, it is obvious that more or less than three might be used without departing from the spirit of the invention.

The plates bearing the numerals are similar to that shown in Fig. 12. It will be seen that each plate consists of a sheet of metal, card-board or other suitable material 7, having cut away portions $7^a$, of a width to correspond with the portions of the plate $7^b$, between adjacent cut away portions. The numerals are painted or otherwise displayed on the face of the plate, as shown in Fig. 12. Each plate is provided with a lug $7^c$, these lugs being in different positions for different plates, and each lug being arranged to coöperate with a magnetically controlled pawl in the manner hereinafter described.

The bottom portion $7^d$, of each plate, is extended beyond the sides, as shown in Fig. 12, and is provided with one or more recesses $7^e$ which control the sounding of a bell or audible signal. In Fig. 13 I have shown the bottoms of the various plates of one unit. The lowermost plate has single recesses $7^e$, and this plate would bear the numeral 1. The next plate has two recesses $7^e$. This plate would bear the numeral 2.

It will be observed that the next bears three recesses, the next four, and the next five. The next, however, has only two recesses, but it will be observed that one of these recesses is equivalent in length to five of such recesses as that shown, for instance, in the plate at the bottom of Fig. 13 in addition to a single recess. The next plate has two recesses, one equivalent to five, and the other equivalent to two; the next one equivalent to five and one equivalent to three, and the plate shown in Fig. 12 is a single recess equivalent to nine single recesses.

Referring now particularly to Fig. 1 it will be seen that plate 6, which forms the front of each of the receptacles or compartments, has cut away portions $6^a$ which correspond in size with the cut away portions $7^a$ of the individual plates, and that the portions $6^a$ are separated by strips $6^b$ which are of the same width as the cut away portions $6^a$. Right here it may be stated that the range of the device shown in the drawing is to $9.99. The plate 6 bears a decimal point 8 between two of the units as shown in Fig. 1.

Referring now to Fig. 4 it will be seen that the plates 7 are held normally in an upward position by means of pawls 9, which engage the lugs $7^c$. These pawls are controlled by magnets, as will be pointed out later. It will be observed, however, from Fig. 4, that when the pawls 9 are moved out of engagement with the lugs $7^c$ the plate will drop. The numeral or numerals are out of sight because part of the plate which bears the numerals is behind the portion $6^b$ of the plate 6. In Fig. 1 I have shown three numerals and zero, but these numerals are painted or otherwise applied to the rear wall 4, and are not upon any of the plates. The numerals zero then are always in view when the plates are up, but are covered when any of the plates are down.

The plates are arranged one behind the other, so that at a distance the dropping of a front plate has substantially the same effect as far as the eye is concerned, as the dropping of a rear plate. This arrangement enables me to indicate ten (10) numerals in a space which is occupied substantially by one numeral. The cut away portion in the plates which bear numerals does not prevent the numerals from being read instantly. It will be understood that these numerals are very large as compared with the numerals, which are brought into view on the ordinary cash register. The arrangement permits me to display thirty (30) numerals in the space occupied by three (3), and this feature I consider an important feature of my invention.

The means by which the plates are dropped consists of a series of magnets 10, which are secured to the back of the wall 4. Each magnet has an armature 11 which is secured to an arm 12 on a shaft 13 to which the pawl 9, see Fig. 4, is secured. It will be obvious that when any of the magnets 10 is energized and the armature 11 is attracted, the pawl 9 will be moved to permit the corresponding plate to drop.

It will be noted from Fig. 5 that the armatures 11 are normally at some distance from their respective magnets. In order to provide for a more extended movement of the pawl 9, which supports the plate I provide mechanical means for moving the arm 12, as well as the electrical means. In Fig. 4 it will be observed that there is a plate 14, which is somewhat similar to the plates 7. This plate has guide pins 15, which work in guide slots 16, so as to limit the vertical movement of the plate. It bears lugs $14^a$, there being one lug for each pawl 9.

As it will be seen from Fig. 5, the magnets of each unit are arranged in two rows for the sake of convenience, and the pawls 9 are arranged on each side of the series of plates of the different units. The lugs $14^a$ are so arranged that on an upper movement of the plate 14 all of the pawls 9 will be simultaneously moved so as to bring the arms 12, see Fig. 5, from the full line position to the dotted line position, in which position they can be readily attracted by any magnet which may be energized. The movement of the pawls 9, however, is not sufficient to clear the lug $7^c$ by means of which the plate is supported, since in order to do this it is necessary to send current through the magnet which is associated with the particular plate to be dropped, thus causing an additional movement of the arm 12, so as to bring the pawl 9 out of engagement with its particular plate, and thereby drop the plate.

I will now explain how the plate 14, as well as the remaining plates are raised.

Referring again to Fig. 1, it will be seen that I have provided bearings 17 at each end of the device for the shafts 18 of a pair of sprocket wheels 19, which bear an endless sprocket chain 20, having secured to it two U-shaped guide members 21 and 22. The former bears a spring pressed arm 23, and the latter bears a rigid arm 24, see Figs. 10 and 11.

Associated with each unit is a bell crank lever like that shown at 25 in Figs. 1, 4, 5 and 10. Each of these bell crank levers is mounted on a pivot rod 26, see Fig. 1, which extends from a bar 27, rearwardly to the wall 4. A spiral spring 28 tends normally to return the bell crank lever to its normal position. The lower end of each of these bell crank levers 25 projects into the path of the arm 24, which is carried by the guide member 22, see Fig. 6, so that as the sprocket chain moves forwardly, the bell crank levers are raised in succession, beginning with the unit on the left, and ending with the unit on the right. Each bell crank lever bears a laterally projecting arm $25^a$ which extends through openings $7^o$ in the plates 7 as well as in the plate 14, the arm $25^a$ being arranged to engage the upper edge of the opening of any of these plates so as to raise the plate when the bell crank lever is moved from the full line position shown in Fig. 4 to that shown in dotted lines.

The plate 14 is provided with a recess $14^x$, which enables the arm $25^a$ to engage the plate 7 for engaging the plate 14.

The endless chain 20 is operated by means to be described later, and as the arm 24 passes the bell crank levers 25, the latter are shifted in succession, as stated. If any of the plates have been dropped, the arm $25^a$ will engage the plate and lift it into the normal position, which is that shown in Fig. 4. The bell crank lever will not only raise the plate to its normal position, but will engage all of the plates and raise them slightly so as to free their pawls 9.

A further movement of the bell crank lever will raise the plate 14, see Fig. 4 by the engagement of the arm $25^a$ with the cam lug $14^y$, so that its lugs $14^a$ will engage the pawls 9 to move them, so as to bring the armatures 11 within the field of the magnets 10, as explained. Immediately after this one of the magnets may be energized if a key corresponding to one of the numerals has been operated on the cash register, and this will cause a movement of the pawl 9, so as to clear the lug $7^c$ so that when the arm 24 passes behind the bell crank lever 25 it will first lower the plate 14, thereby permitting the pawls 9 to swing inwardly with the exception of the pawl which is held up by the energization of its magnet, the plate whose pawl is held up having nothing to support it, falls down into view.

The means by which the audible indications are given comprises three bells of different tones, one bell being associated with each unit. These bells are indicated at 30, 31 and 32. Each bell is provided with a striker arm such as that shown in $30^a$, which arm is secured to a slidable plate 33. Since the plates bearing these arms are alike, a description of one will suffice for the three.

Referring to Figs. 1 and 9 it will be seen that the unit at the left is provided with a plate 33, which is slotted to slide on the guide pins 34. This plate has a series of inclined slots 35, extending upwardly and forwardly from the bottom, there being nine of these slots in the plate. At the end of the plate is a flange 36 which is arranged to be engaged by an arm 37, see Fig. 9 on the guide pin 34. The latter is in fact a shaft, to which a plate 38 is secured.

When the slidable plate 33 is in its normal position in which it is held by a spring 39, see Figs. 1 and 3, it holds the plate 38 in the dotted line position shown in Fig. 1, but when a numeral bearing plate drops downwardly, it engages the plate 38, (see Fig. 3) and swings the pin or shaft 34, thus rotating the arm 37 in the position shown in Fig. 9, and moving the plate 33 toward the right by the engagement of the arm 37 with the flange 36 of the plate 33 thus bringing the slots 35 into registration with a series of recesses 40 shown in dotted lines in Fig. 9, and in full lines in Fig. 3, these recesses being nine (9) in number and being in the bottom of the front portion 6. Normally the slots 35 and the recesses 40 are not in registration, see Fig. 1.

When now one of the plates such as the plate bearing the numeral 4, see Fig. 3, is dropped, the first action is to move the plate 33, so that the slots 35 will register with the slots 40. The plate 4, however, has four (4) recesses $7^e$ in the bottom thereof, see Fig. 13, the lower edge of the plate being in alinement with the lower edge of the plate 33. Now when the spring arm 23 passes underneath the plate, which has been dropped, it will move forwardly until it comes into registration with one of the recesses $7^e$ in the plate bearing the numeral 4, see Fig. 3, when the arm will enter the alined slots and recesses 35—40 and $7^e$, thereby engaging the slidable plate 33 and moving the latter farther to the right against the tension of the spring 39 until it meets the inclined edge $40^a$ of the recess 40, when it will be forced out of the slot 35, thereby permitting the plate 33 to be suddenly drawn to the left, which will cause the hammer or striker $30^a$ to hit the bell 30. This will occur four (4) times for the plate bearing the numeral 4, five (5) times for the plate bearing the numeral 5, six (6) times for the plate bearing the numeral 6, and so on. As the spring arm 23 travels toward the right it will engage the slidable plate corresponding to the plate 33 of the second unit, and will cause the sounding of the second bell in precisely the same manner as described in connection with the first bell. The third bell is operated in the same way, thus an audible indication is given of the numeral which is brought into view above the bell.

The sprocket chain 20 may be operated by any suitable means. The means which I have disclosed consists of an electric motor M, see Figs. 2 and 18. The shaft of this motor is provided with a worm 41, which engages a worm wheel 42 on the shaft 18 bearing the sprocket wheel 19. On the opposite end of the motor shaft is a governor 43 which is arranged to move a sleeve 44 against insulating plate 45, see Figs. 18 and 19, which is hinged at 46 to a plate $46^x$ and which bears a spring and contact 47 arranged to engage a contact 48 carried on an L-shaped arm 49 mounted on a spring standard 50. A spring 51, which bears against a stop 52 tends to press the insulating member 45 against the end of the sleeve 44. At 53, see Figs. 18 and 19, is a block to which is rigidly secured a Z-shaped arm 54, which extends underneath the sleeve 44, and which supports a fulcrum pin 55, see Fig. 21, whose purpose will be explained later.

The plate $46^x$, see Fig. 19, is mounted on a rod 56, which is slidable in bearings 57, secured to the wall 4. The end of this rod 56 is bent at right angles and extends forwardly to the front side of the device, where it is again bent at right angles and extends across the face of the device from right to left, in Figs. 1, 2, 9, 18 and 19. This rod 56 is supported in bearings 58, secured to the front face 6, see Fig. 1, so that the rod may slide longitudinally of the device. The rod 56 bears lugs 59, there being one of these lugs for each of the units.

Referring now particularly to Figs. 1 and 15 to 18 inclusive, I have shown a pawl 60, which is pivoted at 61 to the wall 4, which is provided with a spring 62; one end of which bears on a laterally extended arm 63 so as to hold the outer end of the pawl downwardly. The pawl has an adjustable shoulder 64, which may be brought behind the rod 56, as shown in Fig. 16, to hold the rod in a shifted position. Pivotally mounted at 65 is a releasing lever 66, which is provided with a shoulder 67 at the lower left hand end, in Figs. 15, 16 and 17. The upper part of this lever is arranged to engage the arm 63, as shown in Fig. 17, and as will be explained later.

In Fig. 15 it will be observed that there is an arm 68 pivoted at 69, this arm being connected with an arm 70, which is pivoted at 71 through a link and adjustable connection 72 and $72^x$ respectively. The arm 70 is arranged to engage the rod 56, and to move it to the right. A coiled spring 73, see Fig. 18, is secured to the rod 56, and tends normally to force the latter toward the left in Fig. 18.

The mechanism just described is for the purpose of slowing up the traveling chain 20, while the number is being sounded on a bell, but it will permit the chain to travel faster so as to cut down the time when the spring arm is moving between bells.

The mechanism just described also has another object in view, and that is to cause the motor to slow up not by throwing into resistance in the motor circuit which would cause a waste of current, but by breaking the motor circuit and then closing it so that when it is closed the full current strength is available.

Let us consider that the arm 24 which actuates the bell crank levers 25 to raise the number plates is operated on each unit and is nearing the right end of the machine in Fig. 1. It will engage the arm 68 which through the medium of the link 72 will force the arm 70 (see Fig. 15) against the rod 56, thus moving the latter to the right in Figs. 1, 15 and 18. The movement of the rod 56 to the right will carry with it the plate $46^x$, bearing the hinged member 45. The latter is fulcrumed against the fulcrum screw 55, see Figs. 19 and 21, so that it will be moved from the dotted line position shown in Fig. 19 to the full line position, in which position the sleeve 44 can more easily break the connections at 47—48, thereby reducing the speed of the motor, or bringing it into what I term the second speed. It is held in this position by the pawl 60, whose shoulder 64 engages the rod 56, as shown in Fig. 16.

When the spring arm 23 engages the plate 33 it will move the plate to the right in Fig. 1, whereupon the flange 36 at the end of the plate will engage one of the lugs 59 and moves the rod 56 still farther to the right, thus bringing the member 45, see Fig. 19, into the dot and dash line position in which the contact 47 is forced away from the contact 48. The momentum of the motor will of course cause the continued movement of the chain 20, so that the spring arm 23 will be forced out of the plate 33, as already explained, and permit the latter to spring back, so as to give a tap to the bell.

The spring 73, see Fig. 19, causes the movement of the rod 56 toward the left, and hence will bring the spring contacts 47 and 48 carried by the member 45 into engagement, this completing the circuit of the motor. This action occurs at each sounding of the bell, and results in the slowing up of the motor until the audible indications have been given.

When the spring arm 23 reaches the shoulder 67 of the releasing lever 66, see Fig. 17, it will raise the pawl 60, and thereby permit the rod 56 to assume its normal position, and hence to bring the hinged contact member 45 (see Figs. 18, 19 and 21) into its normal position thus supplying the motor with current and permitting it to return to normal speed.

In Fig. 20 I have shown a device by means of which I may have effective contact at 47—48 without the necessity of using platinum contacts. To attain this end I provide the motor shaft with a cam wheel 75 arranged to engage a cam roller 76 on the end of a rod 77 which is in engagement with the spring upright, which supports the L-shaped plate 49. As the motor shaft revolves this spring upright 50 is forced to vibrate so as to cause a movement of the contact 48 with respect to the contact 47. This vibratory movement tends to prevent the pitting of the contacts or the oxidizing of the same, and makes a good electrical contact which does not depend for its proper maintenance upon being made of platinum.

In Figs. 22, to 24, inclusive, I have shown the means by which the auxiliary indicating device, which has just been described, is connected up with an ordinary cash register. Referring then particularly to Fig. 24, there is shown therein a key lever 80 bearing a key 81, which is fulcrumed at 82, and which is arranged to engage a bar or rod 83 having a lug 84. At 85 is a block pivotally mounted at 86, so as to retain the plate 83 in an upper position after the lug 84 has passed the top of the block. This construction is to be found in the ordinary cash register. It is the means by which the plates or disks which bear the indicating numerals hold them in view.

To one side of the top of the block 85, I secure insulating material 87, upon which is mounted a series of L-shaped conducting members 88, there being one of these conducting members for each member to be indicated, as shown in Fig. 22.

Each conducting member 88 is connected by a wire 89 with one of the magnets 10, see Fig. 14, of one of the three (3) "units" or sets of numeral displaying plates. The opposite terminal of the magnet is connected by means of wire such as that shown at $90^u$, $90^t$ or $90^h$, with a common return 91, switches $S^u$, $S^t$ and $S^h$, being interposed between the conductors leading to the magnets 91, as shown in Fig. 14. The wire 91 leads to the secondary T's of a transformer, the opposite terminal of the transformer being connected by a conductor 92 to the frame of the cash register, or in other words, wire 92 is grounded.

Referring again to Fig. 14 it will be seen that one terminal of the motor M is connected with a lead wire L. The opposite terminal of the motor is connected to a contact 93, which is arranged to be engaged by a movable contact 94, which is moved by the engagement of a swinging arm 95, which is normally held away from the contact 94 by the armature 96 of a magnet 97. One terminal of the magnet 97 is connected with a stationary contact 98 (see Fig. 25), by means of a conductor 99, the other terminal of the magnet 97 being connected to one side of the transformer T's by the conductor 100.

It will be observed that the arm 95, see Fig. 14, is connected by a conductor 101, with a magnet 102, whose armature 103 is connected with a bell crank lever 104 arranged to move into engagement with a universal bar 105 so as to bring the latter in position to simultaneously lock all of the keys of the cash register as long as the magnet 102 is energized. The opposite terminal of magnet 102 is connected by a conductor 106 with one side of the transformer T's.

From the foregoing description of the various parts of the device the operation thereof may be readily understood.

Let us assume that the sale which has been made, involves a transaction of $4.29. The salesman will push the corresponding 4 in one set or unit, that corresponding to 20 in the second set, and that corresponding to 9 in the third set. The depression of any key, as for instance 81, of the cash register will cause the block 85 to swing into the dotted line position shown in Fig. 25 by the ordinary mechanism which forms no part of the present invention. This will cause the momentary closure of a circuit through the magnet 97, see Fig. 14, the circuit being as follows: from the secondary of the transformer T's through 100, 97, 99, 98 and ground, and from ground to the opposite terminal of the transformer.

This will energize the magnet 97 which thereupon pulls up its armature 96 and allows the arm 95 to drop against the movable contact 94, and bring the latter into engagement with the contact 93, while at the same time the end of the arm 95 engages the contact 107. Current now flows from the lead wire L through the motor contact 93—94, and by wire 108 to the opposite lead wire L'. The motor thereupon starts up. At the same time a circuit is closed through the locking magnet 102, see Fig. 24, this circuit being from the opposite side of the transformer through wire 106, magnet 102, wire 101, arm 95, terminal 107, wire 109 to the transformer. The cash register is therefore locked against the operation of another key until the transaction has been recorded and completed.

The switches $S^u$, $S^t$, $S^h$ are closed only momentarily, and they are closed by the action of their respective bell crank levers 25. Thus in Fig. 5, which it will be noted is a view of the back of the machine, when the bell crank lever is moved in the direction indicated by the arrow, a spring 110 is brought into engagement with a contact 111, but when the arm which operates the bell crank lever has passed the same, then the contact is broken. The momentary closures of the switches $S^u$, $S^t$, $S^h$ in connection with the depression of the keys representing the numerals 4.29 will energize the magnets 10, corresponding to these numerals and will drop the plates in the manner already described.

The current will be broken at the contacts 110 111 thereby saving in current. The motor will operate the bell ringing device in the manner already described. The apparatus will keep in motion until the arm 24, see Fig. 3, engages the arm 95, when it will pull the latter free from the contact 107 and underneath the locking lug 96ˣ of the armature 96, which will hold the arm 95 in the position shown in Figs. 3 and 14. This will break the motor circuit and the motor will stop. It will also break the locking circuit of the cash register, which will thereupon permit the operation of the keys of the cash register, the registering of the transaction having been completed. It will thus be seen that I have provided a device by means of which the registrations of an ordinary cash register may be duplicated in such a manner as to prevent intentional thefts and to give a check upon the various salesmen or employees who operate the cash register.

The device consumes comparatively little current due to the fact that means is provided, as described, for cutting off the current when it is not needed, and switching it on in full strength when it is needed.

While I have shown the auxiliary indicating device as connected up with one cash register, it is obvious that the connections might be multiplied so as to connect up with as many cash registers as is desired.

In some instances it may be that one would not wish the audible indications. My invention contemplates the elimination of these audible signals if desired.

I claim:—

1. The combination with a cash register, of an auxiliary indicating device comprising a plurality of plates, means for suspending the plates, electro-magnetic means controlled by the keys of the cash register for dropping any plate at will, and means for automatically restoring the dropped plate to its original position, said last named means comprising a lever having a portion arranged to engage any of the dropped plates, and a traveling arm arranged to engage the lever to operate the latter.

2. The combination with a cash register, of an auxiliary indicating device comprising a plurality of plates, means for suspending the plates, electro-magnetic means controlled by the keys of the cash register for dropping any plate at will, means for automatically restoring the dropped plate to its original position, said last named means comprising a lever having a portion arranged to engage any of the dropped plates, a traveling arm arranged to engage the lever to operate the latter, an endless chain for supporting the arm, and means including an electric motor for operating the endless chain.

3. The combination with a cash register, of an auxiliary indicating device comprising a plurality of plates, means for suspending the plates, electro-magnetic means controlled by the keys of the cash register for dropping any plate at will, means for automatically restoring the dropped plate to its original position, said last named means comprising a lever having a portion arranged to engage any of the dropped plates, a traveling arm arranged to engage the lever to operate the latter, an endless chain for supporting the arm, means including an electric motor for operating the endless chain, and a switch controlled by the keys of the cash register for closing the circuit of the motor.

4. The combination with a cash register, of an auxiliary indicating device comprising a plurality of plates, means for suspending the plates, electro-magnetic means controlled by the keys of the cash register for dropping any plate at will, means for automatically restoring the dropped plate to its original position, said last named means comprising a lever having a portion arranged to engage any of the dropped plates, a traveling arm arranged to engage the lever to operate the latter, an endless chain for supporting the arm, means including an electric motor for operating the endless chain, a switch controlled by the keys of the cash register for closing the circuit of the motor, and means carried by the endless chain for opening the switch to break the circuit through the motor.

5. The combination with a cash register, of an auxiliary indicating device comprising a plurality of plates, means for suspending the plates, electromagnetic means controlled by the keys of the cash register for dropping any plate at will, means for automatically restoring the dropped plate to its original position, said last named means comprising a lever having a portion arranged to engage any of the dropped plates, a traveling arm arranged to engage the lever to operate the latter, an endless chain for supporting the arm, means including an electric motor for operating the endless chain, a switch controlled by the keys of the cash register for closing the circuit of the motor, means carried by the endless chain for opening the switch to break the circuit through the motor, and means carried by the cash register for locking the same when the switch of the motor circuit is closed, and for interlocking the cash register when the switch is open.

6. In an auxiliary indicating device for cash registers, a receptacle, a plurality of plates disposed in said receptacle, said plates being arranged one behind the other, each plate having a plurality of openings separated by portions of the plate equal in width to the width of the openings, one side of each of the plates bearing a single indicating character covering a plurality of the said portions, a front plate having openings arranged to register with the character bearing plates, means for normally suspending the plates, and means for dropping any one of the plates a distance equal to the width of an opening.

7. In an auxiliary indicating device for cash registers, a plurality of plates arranged one behind the other, the faces of the plates being parallel and each plate being provided on its face with a single indicating character and having a plurality of parallel openings separated by portions of the plate equal in width to the width of the openings, said character covering a plurality of said portions, means for suspending all of said plates, and electromagnetic means for dropping any one of said plates a distance the width of the opening, whereby its character is brought into view.

8. In an auxiliary indicating device for cash registers, a plurality of plates arranged one behind the other, the faces of the plates being parallel and each plate being provided on its face with a single indicating character, a plurality of parallel openings separated by portions of the plate equal in width to the width of the openings, said character covering a plurality of said portions, means for suspending all of said plates, electromagnetic means for dropping any one of said plates a distance the width of the opening, whereby its character is brought into view, and a front plate having openings arranged to register with the openings in said character bearing plates.

9. In an auxiliary indicating device for cash registers, a plurality of plates arranged one behind the other, the faces of the plates being parallel and each plate being provided on its face with an indicating character and a plurality of parallel openings separated by portions of the plate equal in width to the width of the openings, means for suspending all of said plates, said means comprising an individual lug carried by each plate, an individual pawl for engaging the lug to support the plate, and electromagnetic means for disengaging the pawl from the lug to release the plate.

10. In an auxiliary indicating device for cash registers, a plurality of plates arranged one behind the other, the faces of the plates being parallel and each plate being provided on its face with an indicating character and a plurality of parallel openings separated by portions of the plate equal in width to the width of the openings, means for suspending all of said plates, said means comprising an individual lug carried by each plate, an individual pawl for engaging the lug to support the plate, electromagnetic means for disengaging the pawl from the lug to release the plate, and means for restoring the plate to its normal position.

11. In an auxiliary indicating device for cash registers, a plurality of plates arranged one behind the other, the faces of the plates being parallel and each plate being provided on its face with an indicating character and a plurality of parallel openings separated by portions of the plate equal in width to the width of the openings, means for suspending all of said plates, said means comprising an individual lug carried by each plate, an individual pawl for engaging the lug to support the plate, electromagnetic means for disengaging the pawl from the lug to release the plate, means for restoring the plate to its normal position, and means controlled by the dropping of any one plate for giving an audible indication of the numeral on the dropped plate.

12. In an auxiliary indicating device for cash registers, a plurality of sets of character bearing indicating plates, each of said indicating plates having a plurality of openings separated by portions of the plate equal in width to the width of the openings, a single character covering a plurality of said portions, means for supporting said plates, and means for dropping one plate of each set in succession a distance equal to the width of the openings in the plate.

13. In an auxiliary indicating device for cash registers, a plurality of sets of character bearing indicating plates, each of said indicating plates having a plurality of openings separated by portions of the plate equal in width to the width of the openings, means for supporting said plates, means for dropping one plate of each set in succession a distance equal to the width of the openings in the plate, and means for sounding in succession an audible indication of the numerals borne by the plates thus dropped in succession.

14. In an auxiliary indicating device for cash registers, a plurality of sets of character bearing indicating plates, each of said indicating plates having a plurality of openings separated by portions of the plate equal in width to the width of the openings, means for supporting said plates, means for dropping one plate of each set in succession a distance equal to the width of the openings in the plate, means for sounding in succession an audible indication of the numerals borne by the plates thus dropped in succession, and means for simultaneously restoring the plates of each set to their original positions.

15. In an auxiliary indicating device for cash registers, a plurality of plates, each bearing a numeral, means for normally suspending the plates to retain the numerals out of view, means for dropping any individual plate for bringing it into view, means for restoring the plate to its original position, said last named means comprising an endless sprocket chain, an arm carried by said sprocket chain, and a bell crank lever arranged to be engaged by said arm and extending underneath all of said plates.

16. In an auxiliary indicating device for cash registers, a plurality of plates, each bearing a numeral, means for normally suspending the plates to retain the numerals out of view, means for dropping any individual plate for bringing it into view, means for restoring the plate to its original position, said last named means comprising an endless sprocket chain, an arm carried by said sprocket chain, a bell crank lever arranged to be engaged by said arm and extending underneath all of said plates, a bell associated with said plates, a movable tappet for said bell, a second arm carried by said sprocket chain, and means engaged by said second arm for operating the tappet to give an audible indication of the numeral borne by the plate dropped.

17. In an auxiliary indicating device for cash registers, a plurality of plates, each bearing a numeral, means for normally suspending the plates to retain the numerals out of view, means for dropping any individual plate for bringing it into view, means for restoring the plate to its original position, said last named means comprising an endless sprocket chain, an arm carried by said sprocket chain, a bell crank lever arranged to be engaged by said arm and extending underneath all of said plates, a bell associated with said plates, a movable tappet for said bell, a second arm carried by said sprocket chain, means engaged by said second arm for operating the tappet to give an audible indication of the numeral borne by the plate dropped, an electric motor for operating said sprocket chain, and means for slowing down the motor during the sounding of the bell.

18. In an auxiliary indicating device for cash registers, a plurality of plates, each bearing a numeral, means for normally suspending the plates to retain the numerals out of view, means for dropping any individual plate for bringing it into view, means for restoring the plate to its original position, said last named means comprising an endless sprocket chain, an arm carried by said sprocket chain, a bell crank lever arranged to be engaged by said arm and extending underneath all of said plates, a bell associated with said plates, a movable tappet for said bell, a second arm carried by said sprocket chain, means engaged by said second arm for operating the tappet to give an audible indication of the numeral borne by the plate dropped, an electric motor for operating said sprocket chain, means for slowing down the motor during the sounding of the bell, said last named means comprising a circuit breaker operated by the tappet moving device.

OSCAR E. GROSHELL.